(12) United States Patent
Haefner et al.

(10) Patent No.: US 7,503,954 B2
(45) Date of Patent: Mar. 17, 2009

(54) FILTER ELEMENT

(75) Inventors: Uwe Haefner, Weinheim (DE); Roland Dobner, Wald-Michelbach (DE); Peter Capuani, Wald-Michelbach (DE); Volker Braeunling, Heppenheim (DE)

(73) Assignee: Carl Freudenberg KG, Weinheim (DE)

( * ) Notice: Subject to any disclaimer, the term of this patent is extended or adjusted under 35 U.S.C. 154(b) by 336 days.

(21) Appl. No.: 11/171,874

(22) Filed: Jun. 30, 2005

(65) Prior Publication Data

US 2006/0000197 A1 Jan. 5, 2006

(30) Foreign Application Priority Data

Jul. 1, 2004 (DE) .................... 10 2004 031 809

(51) Int. Cl.
*B01D 46/00* (2006.01)

(52) U.S. Cl. .................... 55/502; 55/497; 55/511; 55/DIG. 31; 55/521; 96/134

(58) Field of Classification Search .................. 55/497, 55/500, 502, 509, 511, 521; 210/493.1, 493.5
See application file for complete search history.

(56) References Cited

U.S. PATENT DOCUMENTS

| | | | | |
|---|---|---|---|---|
| 3,164,456 A | * | 1/1965 | Brainerd, Jr. et al. | 55/500 |
| 3,815,754 A | * | 6/1974 | Rosenberg | 210/445 |
| 4,133,661 A | * | 1/1979 | Strnad | 55/497 |
| 4,181,513 A | * | 1/1980 | Fukuda et al. | 96/153 |
| 5,022,901 A | * | 6/1991 | Meunier | 96/134 |
| 5,501,794 A | * | 3/1996 | Van de Graaf et al. | 210/493.3 |
| 5,509,950 A | * | 4/1996 | van de Graaf et al. | 55/486 |
| 5,639,287 A | * | 6/1997 | Van de Graaf et al. | 55/385.3 |
| 5,679,122 A | * | 10/1997 | Moll et al. | 55/497 |
| 5,792,229 A | * | 8/1998 | Sassa et al. | 55/497 |
| 6,267,796 B1 | * | 7/2001 | Schottmer | 55/502 |
| 6,293,984 B1 | * | 9/2001 | Oda et al. | 55/497 |
| 6,454,826 B2 | * | 9/2002 | Fath et al. | 55/490 |
| 6,726,751 B2 | * | 4/2004 | Bause et al. | 96/134 |
| 6,740,136 B2 | * | 5/2004 | Duffy | 55/497 |
| 7,063,733 B2 | * | 6/2006 | Mori et al. | 96/135 |

FOREIGN PATENT DOCUMENTS

| | | |
|---|---|---|
| DE | 40 39 286 | 6/1992 |
| DE | 196 19 106 | 11/1997 |
| DE | 102 41 748 | 3/2004 |
| JP | 3-152319 | 6/1991 |
| JP | 9-173747 | 7/1997 |

* cited by examiner

*Primary Examiner*—Duane S Smith
*Assistant Examiner*—Robert A Clemente
(74) *Attorney, Agent, or Firm*—Davidson, Davidson & Kappel, LLC (57) ABSTRACT

A filter element includes a filter web pleated in an essentially zigzag manner and made, in particular, of a nonwoven material, for insertion into a holder such as a filter frame and/or a filter housing, having at least one end-positioned wall of an essentially flat design. The filter element includes at least one end face, viewed in the direction of the pleats. To achieve a tighter seal, the end face of the filter element is curved outward in a defined convex manner, and the filter web material is selected and/or its end face conditioned so that, when inserted into the holder, the end face of the filter web may be placed leak-tight against the end wall of the holder without corrugation under elastic pre-tension.

14 Claims, 8 Drawing Sheets

PRIOR ART

Fig. 4

PRIOR ART

Fig. 5

PRIOR ART

Fig. 7

PRIOR ART

FILTER ELEMENT

Priority is claimed to German Patent Application No. DE 10 2004 031 809.3, filed on Jul. 1, 2004, the entire disclosure of which is incorporated by reference herein.

The present invention relates to a filter element having a filter web pleated in an essentially zigzag manner and made, in particular, of nonwoven fabric, for insertion into a holding device, for example a filter frame and/or a filter housing, including at least one end-positioned wall of an essentially flat design, the filter element having at least one end, viewed in the direction of the pleats, that is associated with the essentially flat end wall of the holder. The present invention further relates to a filter system having a filter element and a holding device.

BACKGROUND

Filter elements having a filter web pleated in a zigzag manner and made, in particular, of nonwoven fabric, are manufactured for a wide range of applications. For example, they are used to filter fresh air for the interior of a motor vehicle as well as in air-conditioning systems for enclosed spaces. In motor vehicles, filter elements of this type are inserted into holding devices such as filter frames or filter housings. The disadvantage of such filter elements or such a filter system is that leakage may occur, in particular, at the ends of the filter elements. During continuous operation, this leakage may result in warping or deformation of the adjacent pleats, further intensifying the bypass effect and ultimately resulting in inadequate utilization of the filter areas. Due to this circumstance, there is the danger that the permissible technical leakage requirements may no longer be met. In cases where a particularly tight seal is required, it has been increasingly necessary to provide, in the end region of the filter element, additional sealing and/or reinforcing elements such as labyrinth seals, foams, profiles or, in particular, additional nonwoven or textile edges in a wide range of designs, etc.

SUMMARY OF THE INVENTION

An object of the present invention is to improve on a filter element or a filter system of the aforementioned type so that a tighter seal is achieved in the installed state.

The present invention provides a filter element (1) having a filter web (2) pleated in an essentially zigzag manner and made, in particular, of a nonwoven material, for insertion into a holder (8) such as a filter frame and/or a filter housing, having at least one end-positioned wall (8a) of an essentially flat design. The filter element (1) includes at least one end face (5), viewed in the direction of the pleats, that is associated with the essentially flat wall (8a) of the holder (8), wherein the end face (5) of the filter element (1) is curved outward in a defined convex manner, and the filter web material (2) is selected and/or its end face (5) conditioned in such a way that, when inserted into the holder (8), the end face (5) of the filter web (2) may rest leak-tight against the end wall (8a) of the holder (8) without corrugation under elastic pre-tension.

In addition, the present invention provides a filter system having such a filter element (1) and a holder (8), such as a filter frame and/or a filter housing, into which the filter element (1) is insertable.

According to the present invention, in the case of a filter element having a filter web pleated in an essentially zigzag manner and made, in particular, of a nonwoven fabric that is positioned in a holding device such as a filter frame and/or a filter housing, including at least one end-positioned wall of an essentially flat design, the filter element having at least one end, viewed in the direction of the pleats, that is associated with the essentially flat end wall of the holder, the end of the filter element is curved outward in a defined convex manner, and the filter web material is selected and/or its end conditioned so that, when inserted into the holder, the end of the filter element may be placed leak-tight against the associated wall of the holder without corrugation under elastic pre-tension.

Surprisingly, it has been found that this design of the end of the filter element, which was originally felt to be defective and undesirable by the inventors and which is attributable, for example, to an incompletely developed pleat tip geometry of the filter material during manufacturing, may result in a greatly improved sealing capacity of the filter element against the holding device. The only requirement is that the filter web material be selected or conditioned in the end area of the filter element so that corrugation does not occur when placed against the associated essentially flat wall.

Once it has been recognized that a convex curvature of the end of the filter element may improve the sealing capacity against the holder, only minor steps need to be taken to prevent the filter web material from corrugating when the outwardly curved, convex end of the filter element is placed against the associated, essentially flat housing wall. For example, it is obvious that the stiffer the filter web material, the easier it is to achieve the effect according to the present invention. It was possible to determine that the undesirable corrugation occurred, in particular, when a very thin, flexible filter web material was used. A coating, for example, a rubber coating of the filter web material on the end of the filter element also improves the effect according to the present invention. The term "conditioning" in the sense of the present invention should therefore be understood as being all measures suitable for influencing the properties of the filter web material, for example to stiffen the filter web material, in a manner that largely avoids the aforementioned corrugation.

The end wall of the house associated with the end of the filter element designed according to the present invention has an essentially flat design. It is obvious that the effect according to the present invention also occurs if the associated housing wall is slightly curved (convexly or concavely) in one direction or the other.

Those skilled in the art may easily determine the correct degree of curvature, for example on the basis of a few simple routine experiments, paying attention to housing and filter element tolerances.

In a preferred embodiment of the present invention, the filter web has a pleat runout region at the end, the convex curvature being introduced into the pleat runout region. This embodiment is very easy and cost-effective to produce. If the nature of the filter web causes a tendency to corrugate when the pleat runout region is placed against the wall of the holding device, the material may be stiffened or impregnated or rubber-coated or similarly treated in this area, for example, as described above. However, the nature of the filter web material itself preferably makes the latter stiff enough to render any auxiliary means of sealing unnecessary.

A particularly simple arrangement is to use an essentially known combination filter as the filter element. This is understood to be a filter element, usually made of a nonwoven fabric, whose filter web includes at least one layer of a particle-filtering material and a least one layer of a material that filters chemical contaminants, in particular an adsorbent material such as activated carbon. Due to the fact that the filter web is made of multiple layers of filter material, it is stiffer than single-layer filters, which prevents corrugation when the curved pleat runout region is placed against the holder wall. To secure the activated carbon in the carrier material, combination filters are also usually rubber-coated on the edge of the filter web, which further helps achieve a tight seal. However, a combination filter of the aforementioned type achieves a very tight seal even without this rubber coating. In particular, the sealing effect is so good that no additional sealing agents are needed. This good sealing effect is achieved solely by the convex curvature of the pleat runout region without using additional sealing and/or reinforcing elements (labyrinth seals, foams, profiles or, in particular, additional nonwoven or textile edges in a wide range of designs, etc.), which would have to be applied in an additional manufacturing step. This very good sealing effect achieved even without the use of additional sealing or reinforcing elements occurs not only if the end of the holder wall associated with the end of the filter element designed according to the present invention is provided with an essentially flat design, but also if the wall is designed with a slightly convex or concave curvature.

The filter element according to the present invention may be easily and very economically manufactured, for example, on a fully automatic selvedge gumming machine in which the filters are produced by cutting across a theoretically endless filter web that is pleated in a zigzag manner. As mentioned above, the pleat tip geometries may be incompletely formed, particularly in the case of filter web materials that have a certain degree of stiffness, which ultimately results in the outward curvature of the pleat runout according to the present invention, which was originally considered to be undesirable.

In cases in which a filter system must provide a particularly tight seal, however, additional sealing agents may be provided. For example, a labyrinth seal may be provided in addition to the outward curvature according to the present invention, for example in the form of a sword that is known per se and is situated at the end of the holder and engages with the pleat runout of the filter element.

The present invention may also be applied to filter elements made of any type of filter material. However, the filter web is preferably made of a nonwoven fabric. As mentioned above, the filter web may also be designed in one or more layers, for example, a particle filter layer and a chemical filter layer, in particular an activated carbon filter layer.

The filter element according to the present invention or the filter system according to the present invention may be used wherever harmful substances need to be removed from a fluid flow, regardless of whether it is a gas or a liquid flow.

A preferred application is one in air-conditioning systems for enclosed spaces, both mobile and stationary applications being conceivable. A filter element or a filter system according to the present invention is particularly preferably used in an air conditioning system for a motor vehicle.

BRIEF DESCRIPTION OF THE DRAWINGS

The present invention is explained in greater detail below on the basis of the drawings, in which.

DETAILED DESCRIPTION

Figure 1:
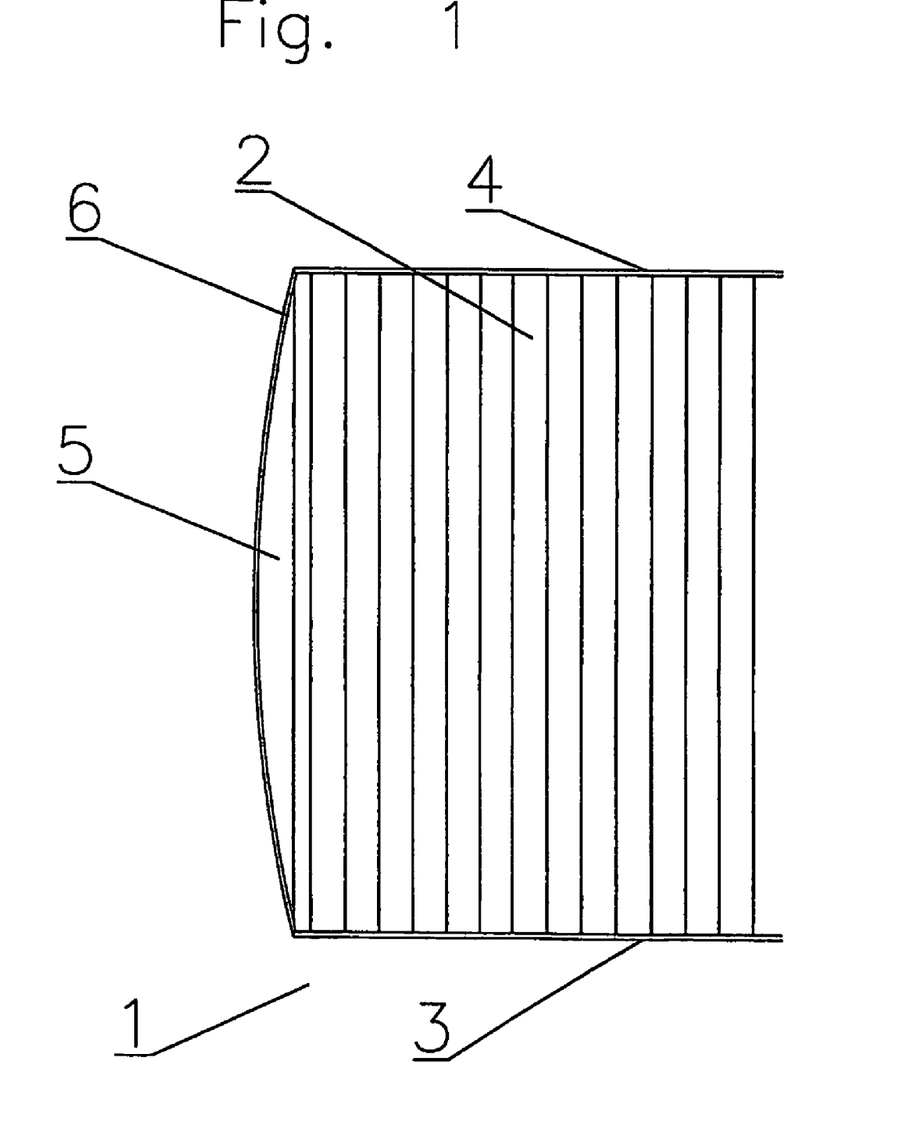
FIG. 1: shows a schematic partial top view of a filter element according to the present invention.
Figure 2:
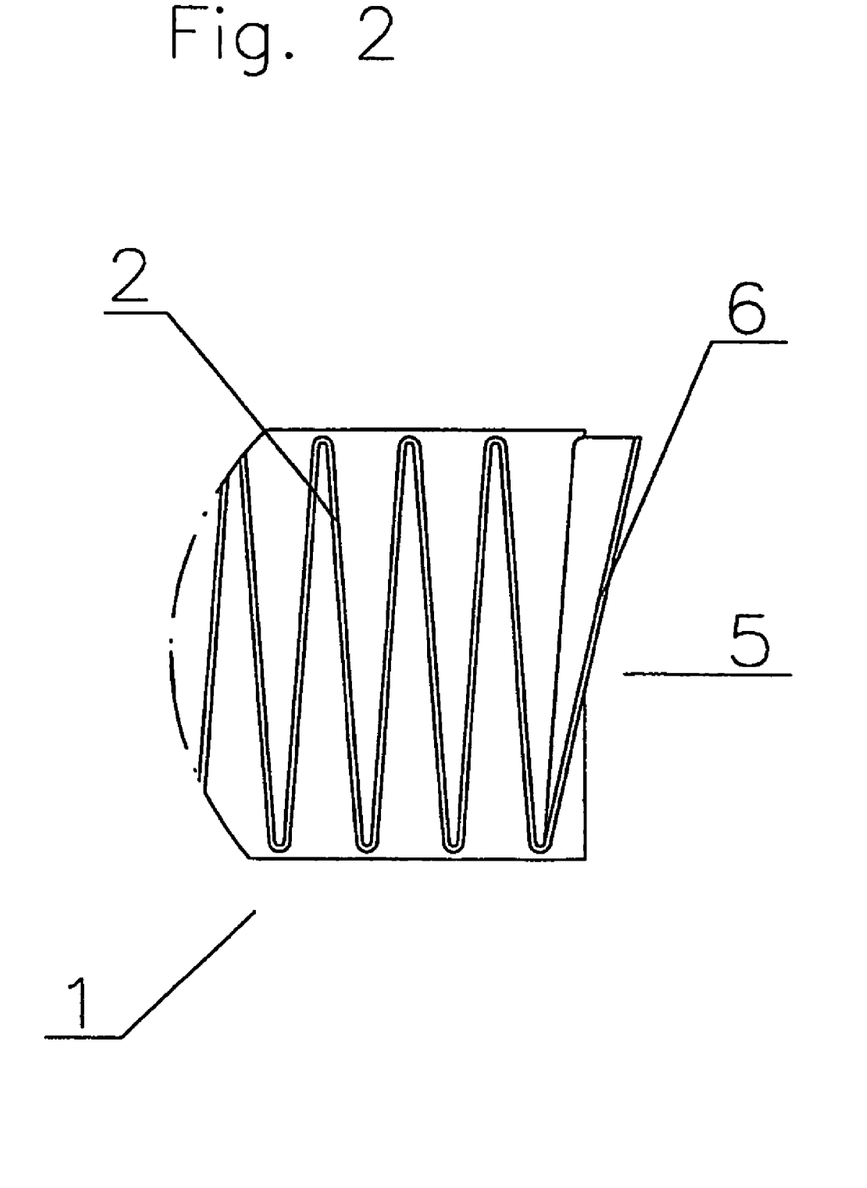
FIG. 2: shows the end face of the filter element according to the present invention from FIG. 1 in a schematic sectional side view.

FIGS. 1 and 2 show a filter element 1 having a filter web 2 that is pleated in a zigzag manner. Without limiting the generality, filter element 1 is essentially plate-shaped and has two diametrically opposed longitudinal sides 3, 4. The illustration shows one of the two ends of the filter element. According to a preferred embodiment of the present invention, filter element 1 has a convex, outwardly curved pleat runout region 6 at end 5. However, the following statements also apply to any other possible embodiment of the end of the filter element according to the present invention.

Figure 3:
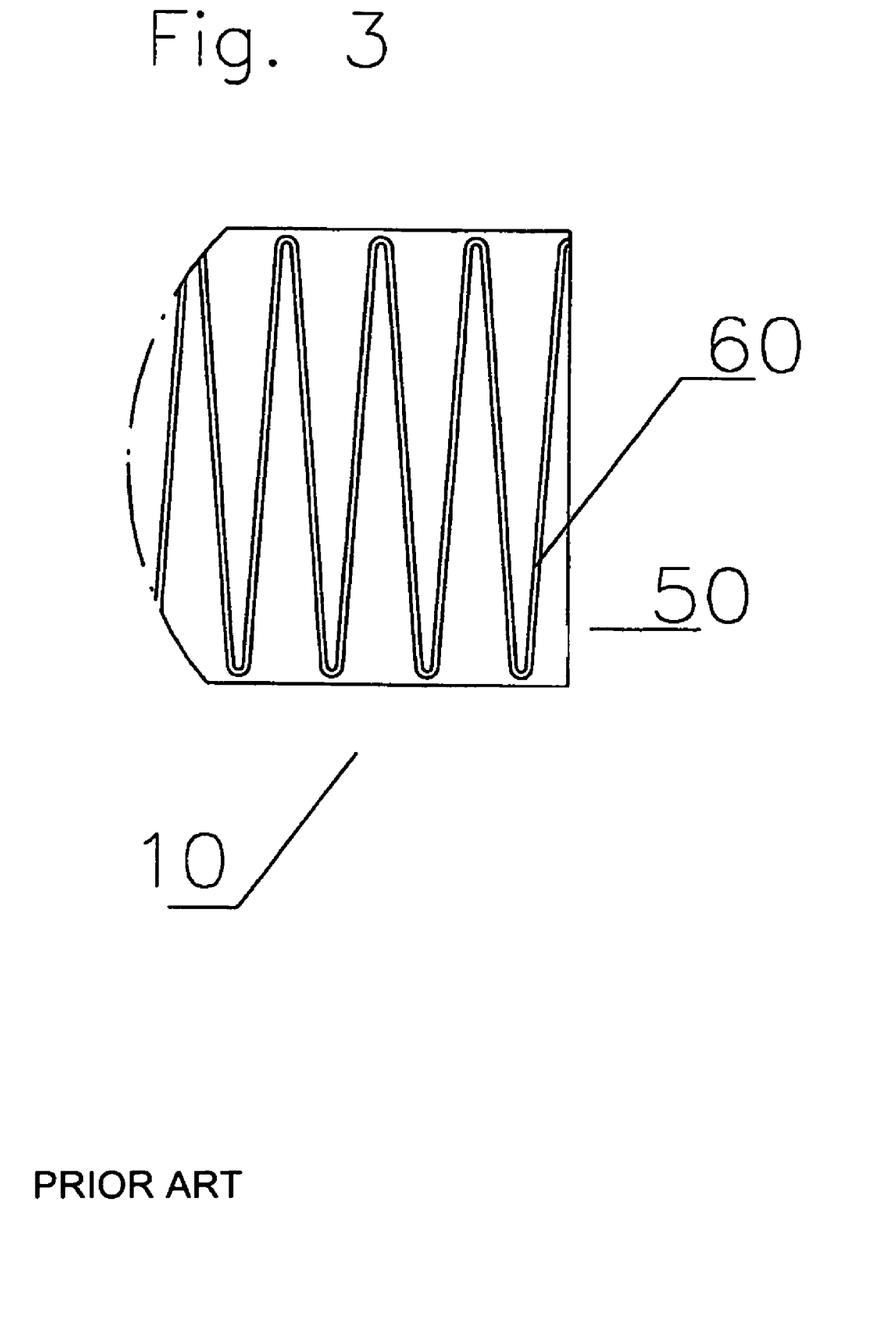
FIG. 3: shows a schematic sectional side view of the end face of a filter element according to the related art.
Figure 4:
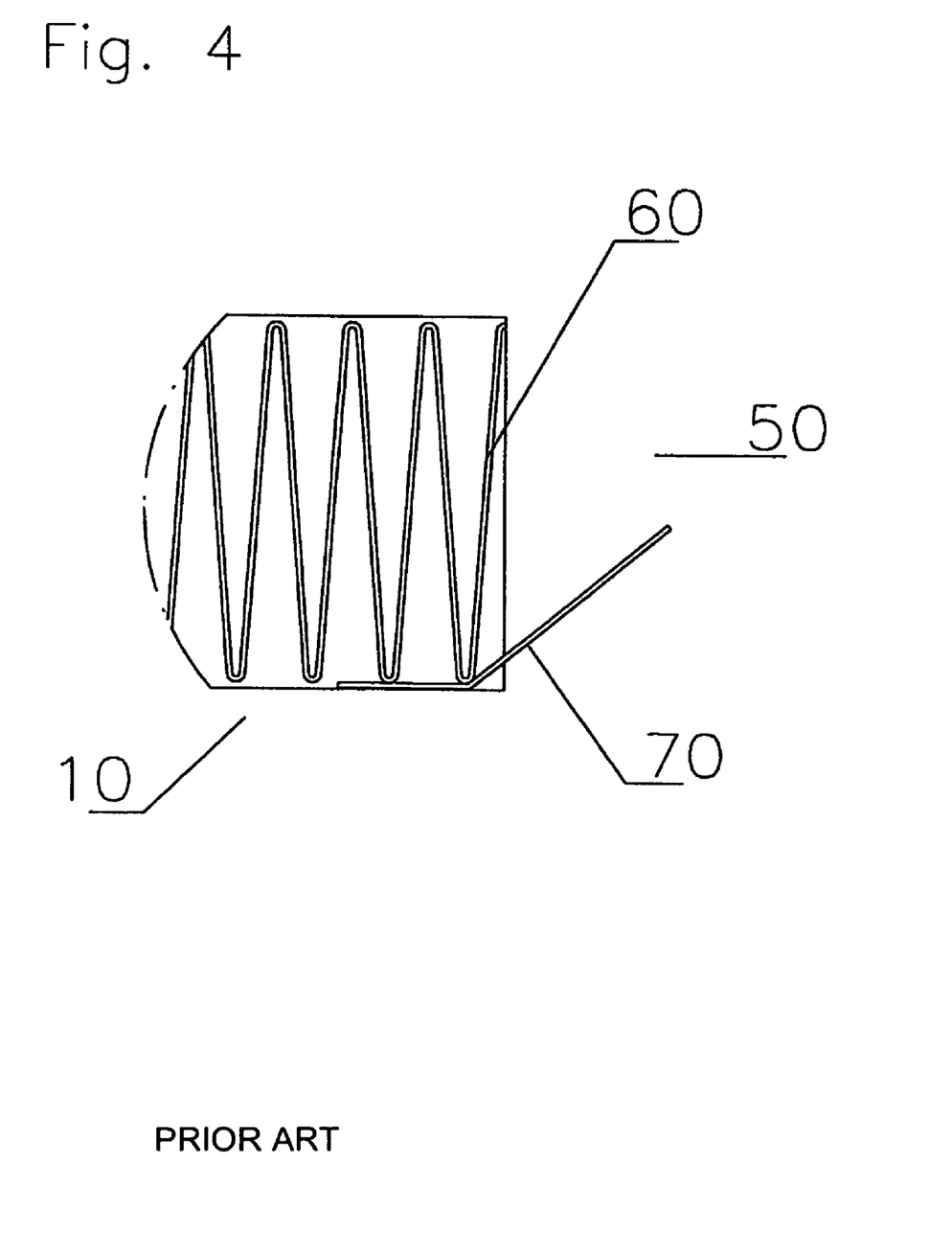
FIG. 4: shows a schematic sectional side view of the end face of a filter element according to the related art, using a nonwoven strip as the sealing element.
Figure 5:
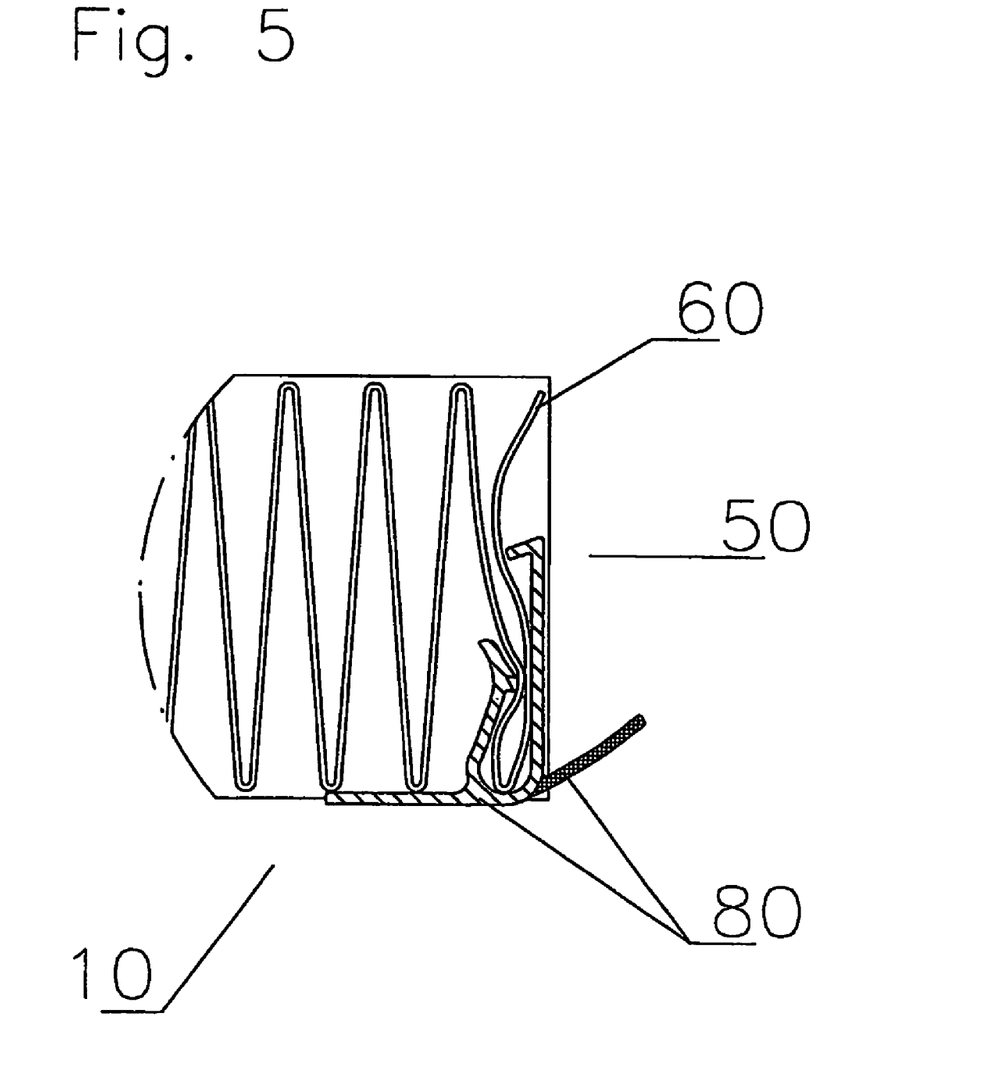
FIG. 5: shows a schematic sectional side view of the end face of a filter element according to the related art, using a sealing lip profile as the sealing element.

For comparison, FIG. 3 shows a filter element 10 according to the related art, which has a conventional pleat runout region 60. In the case of an end 50 of filter element 10 designed in this manner, special additional sealing elements must be provided in the installed state to seal the ends against the associated holder wall. FIGS. 4 and 5 show examples of common sealing elements used to seal the end of a filter element according to the related art, as shown in FIG. 3, against the associated holding device. In the interest of clarity, the holding device is not shown in these figures. FIG. 4 shows a filter having a nonwoven strip 70 and FIG. 5 a filter having a sealing lip profile 80.

In the figures, identical reference numerals designate identical parts.

Figure 6:
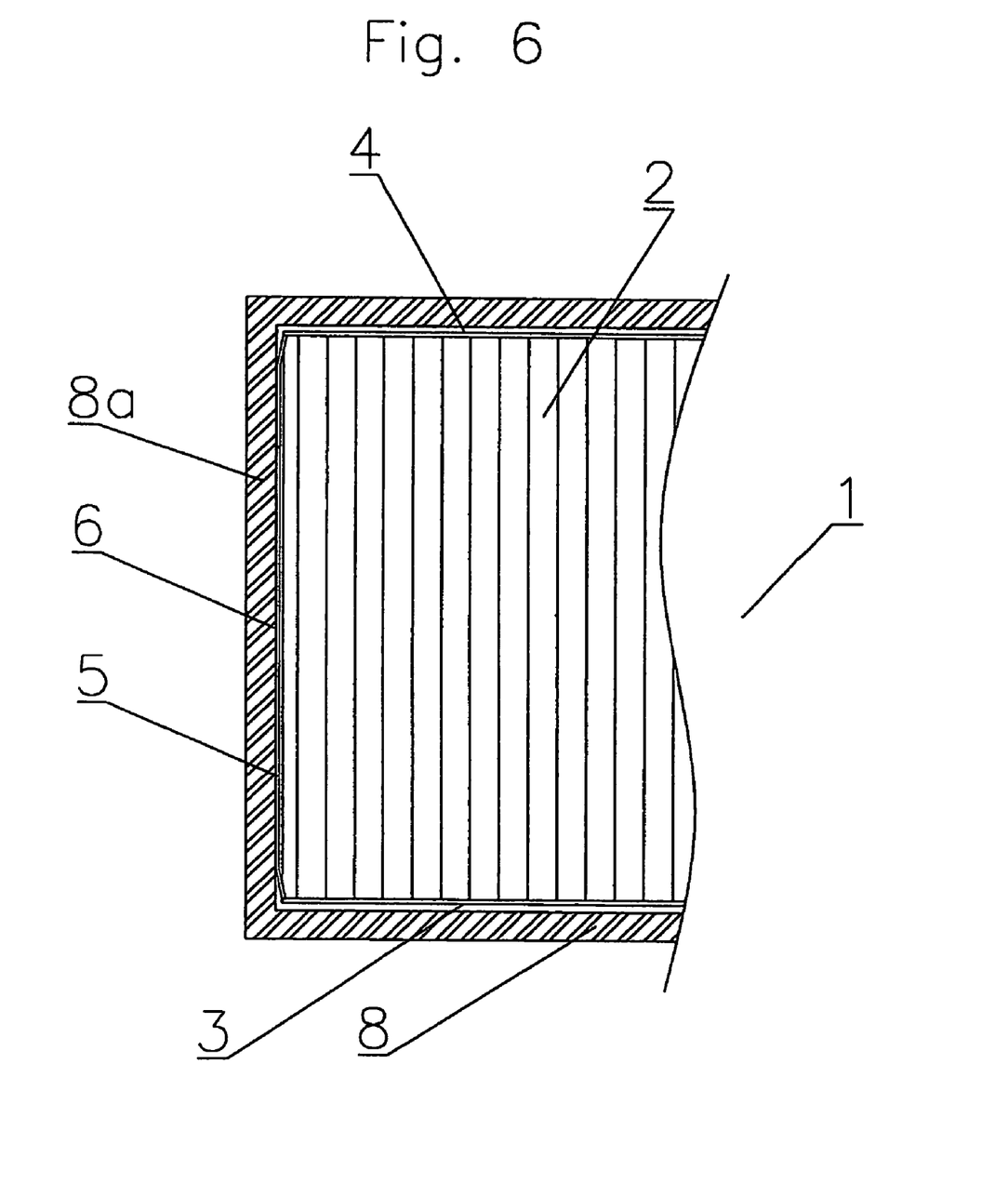
FIG. 6: shows a schematic partial representation, viewed from above, of a filter element according to the present invention in the installed state.

FIG. 6 shows a filter element 1 according to the present invention in the installed state. It is apparent that convex, outwardly curved pleat runout region 6 rests leak-tight across nearly its entire width against associated wall 8a of holding device 8 under elastic pre-tension.

Figure 7:
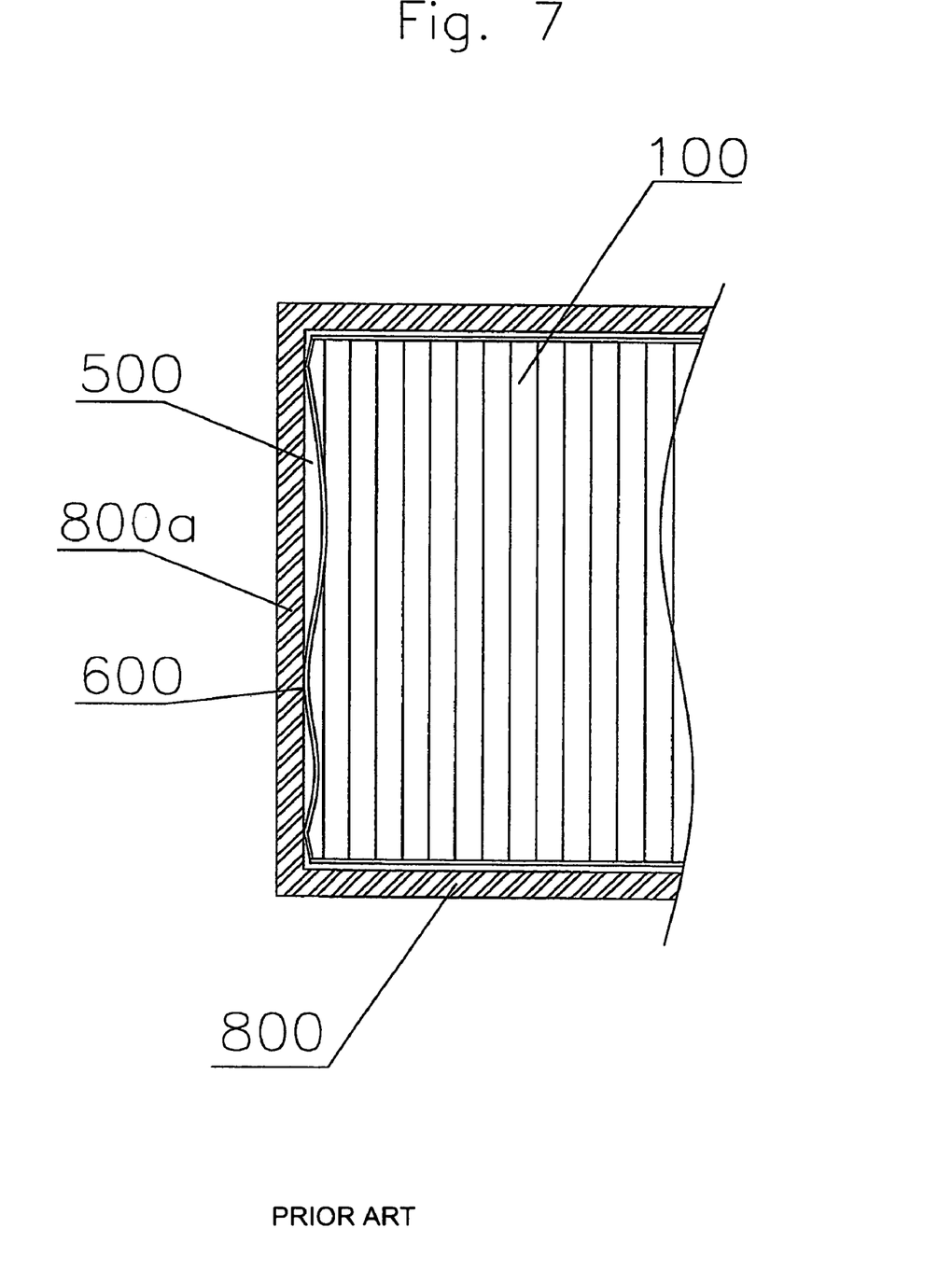
FIG. 7: shows a schematic partial top view of a filter element according to the related art in the installed state.

By way of comparison, FIG. 7 shows a filter element 100 in the installed state having a convex, outwardly curved pleat runout region 600 at end 500 of filter element 100, in which the filter web material obviously does not meet the requirements of the present invention. A conventional particle filter, for example, which is usually made of a relatively thin and flexible filter web material, demonstrates this type of behavior. It is apparent that corrugation occurs in pleat runout region 600 even when it rests against associated wall 800a of holding device 800. At best, the sealing action is unsatisfactory.

Figure 8:
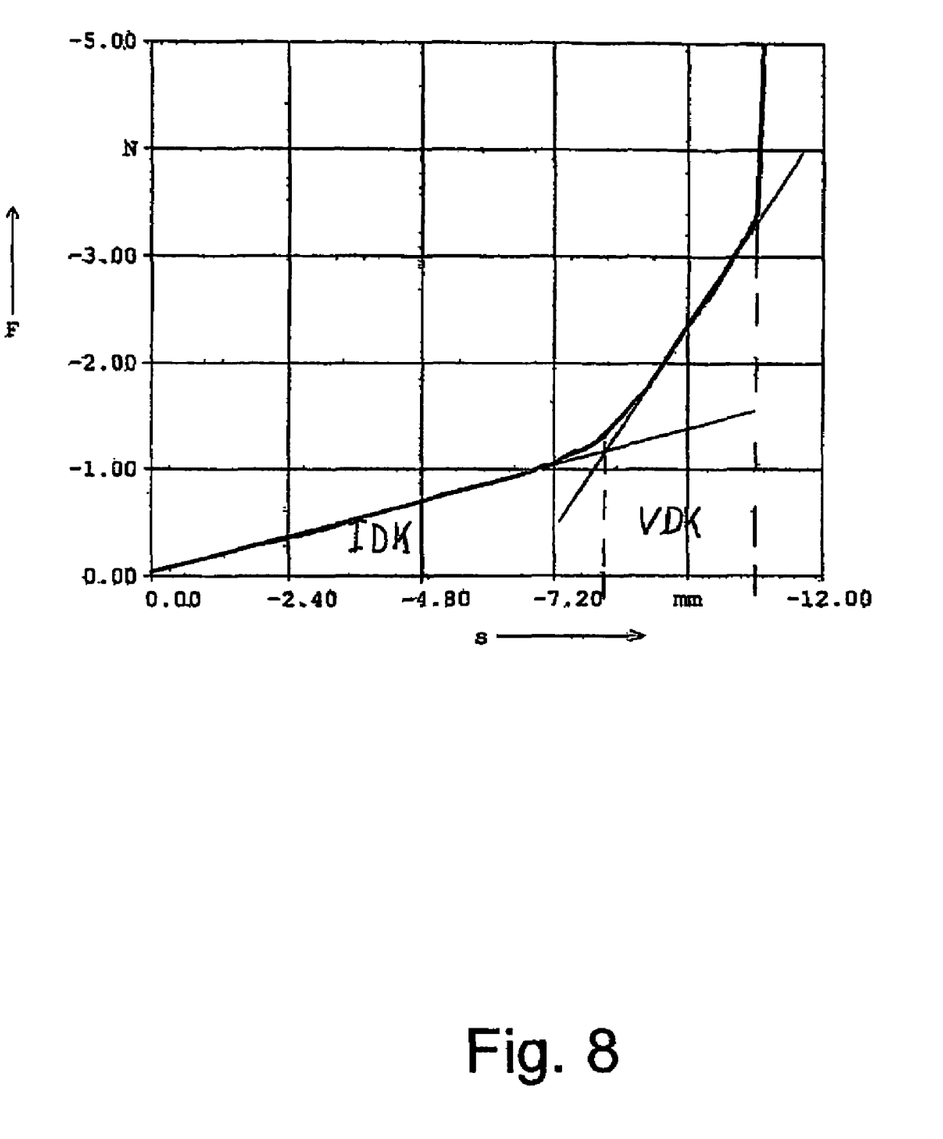
FIG. 8: shows a force/displacement diagram, measured on a filter element according to the present invention.

FIG. 8 shows the result of a measurement of force, as a function of displacement, to be applied to a plate, which, in the case of a combination filter element designed according to the present invention having a convex, outwardly curved pleat runout region, is applied from the end of the filter element to the convex, outwardly curved pleat runout region, thereby pressing it—like in the installed state in a holding device—parallel to the lateral limiting surfaces of the filter element in the direction of the active filter area. The combination filter element used was made of a nonwoven carrier material designed as a particle filter, an activated carbon layer in which activated carbon particles were embedded into nonwoven material and a nonwoven cover material, and it had an end width of approximately 190 mm and a filter height of approximately 25 mm, the apex of the pleat runout region being positioned at a distance of approximately 19 mm from the back of the adjacent pleat.

The diagram shows that the force initially rises only very slowly as the pleat runout is displaced. At a distance of approximately 8 mm, a significant variation in the force/displacement curve is visible. The force increases much more rapidly as compression progresses. This variation occurs more or less at the same point where the pleat runout is placed in a position that is essentially parallel to the backs of the remaining pleats. From this point on, the pleat runout material is unable to move any farther, as forces—which are apparent in the sharp rise in the curve—counteract further compression from the side of the filter edge. The additional very steep rise in the curve at approximately 11 mm is attributable to the lateral filter element limiting walls setting on the plate.

This diagram illustrates a further advantage of a filter element according to the present invention. The force variation in the middle region of the curve, i.e., starting at approximately 8 mm, is responsible for the elastic pre-tension as the pleat runout is placed against the associated housing wall. It is apparent that the force acting upon the limiting wall is relatively high. It is also apparent that this region in which the force rises sharply extends approximately 2 mm to 3 mm from the end of the lateral filter element limiting walls (a nearly vertical increase) toward the active filter area. Because the length of the lateral limiting walls more or less equals the length of the lateral holder walls, and because tolerances in the range of approximately 2 mm are usually allowed in the dimensions of the filter element and associated holder, for example in the application as an air filter for the interior of a car, these tolerances are compensated for by designing the end of the filter element according to the present invention. The level of elastic pre-tension remains constant within this tolerance range.

In principle, this behavior is exhibited by all filter elements designed according to the present invention.

Exemplary Embodiment

Leakage measurements were taken at the ends of combination filters having different designs of the end regions. The end of a combination filter (made of materials that are used for mass production in the automotive industry) was selected as the geometry. During the leakage measurements, the active filter area was covered in each case to determine the flow rate through the edge regions between the filter element and holder. One end was measured for leakage; the two longitudinal sides and the second end provided an optimum seal.

The filters were measured at an applied pressure difference of 100 Pa. The design of the end regions corresponded to the embodiments illustrated in FIGS. 1 and 2 ("present invention"), FIG. 3 ("without end sealing"), FIG. 4 ("nonwoven strip") and FIG. 5 ("sealing lip profile").

The following values were obtained through the measurements for leakage at the end:

| Embodiment | Leakage rate |
|---|---|
| "Invention" (FIGS. 1 & 2) | 46 L/min |
| "Without seal" (FIG. 3) | 410 L/min |
| "Nonwoven strip" (FIG. 4) | 48 L/min |
| "Sealing lip profile" (FIG. 5) | 38 L/min |

The above results show that the leakage rates of the filter system designed according to the present invention achieve the low leakage rates obtained by other previously established sealing system having additional sealing elements. The filter system according to the present invention therefore not only achieves the leakage rates required by industry, but is also easy and economical to produce.

What is claimed is:

1. A filter element for insertion into a holder having at least one substantially flat end wall, the filter element comprising:
   a filter web material pleated in a zigzag manner so as to define a plurality of pleats; and
   at least one end face associated with the flat end wall and being curved outward in a defined convex manner with respect to the filter web material, wherein the end face is configured to rest leak-tight against the end wall without corrugation and under elastic pre-tension when the filter element is inserted into the holder;
   wherein the filter element has two opposed longitudinal sides, the pleats running between the two sides and the end face curving outwardly between the two sides in the convex manner.

2. The filter element as recited in claim 1, wherein the filter web includes a non-woven material.

3. The filter element as recited in claim 2, wherein the leak-tight relationship between the end face and the end wall is due to at least one of a selection of the web material and a conditioning of the end face.

4. The filter element as recited in claim 1, wherein the holder is one of a filter frame and a filter housing.

5. The filter element as recited in claim 1, wherein the end face is disposed in a direction of the plurality of pleat.

6. The filter element as recited in claim 1, wherein the end face includes a pleat runout region having a convex curvature.

7. The filter element as recited in claim 6, wherein the filter element is stiffened in the pleat runout region.

8. The filter element as recited in claim 1, wherein the filter element is a combination filter, the filter web includes at least one layer of a particle-filtering material and at least one layer of a chemical contaminant filtering material.

9. The filter element as recited in claim 8, chemical contaminant filtering material includes an adsorbent material.

10. The filter element as recited in claim 9, wherein the adsorbent material includes activated carbon.

11. A filter system comprising:
    a holder having at least one substantially flat end wall; and
    a filter element inserted into including a filter web material pleated in a zigzag manner so as to define a plurality of pleats and at least one end face curved outward in a defined convex manner with respect to the filter web material and resting leak-tight against the end wall without corrugation and under elastic pre-tension;
    wherein the filter element has two opposed longitudinal sides, the pleats running between the two sides and the end face curving outwardly between the two sides in the convex manner.

12. The filter element as recited in claim 11, wherein the holder is one of a filter frame and a filter housing.

13. The filter system as recited in claim 11, further comprising an additional labyrinth seal disposed between the at least one end face and the respective at least one end wall.

14. The filter element as recited in claim 13, wherein the labyrinth seal includes a sword in the holder.

\* \* \* \* \*